United States Patent [19]

Webb

[11] Patent Number: 5,238,566
[45] Date of Patent: Aug. 24, 1993

[54] FLUID STRAINER INCLUDING INFLATABLE BELLOWS FOR BACKWASHING SAME

[75] Inventor: David A. Webb, Bristol, United Kingdom

[73] Assignee: Merpro Montassa Limited, United Kingdom

[21] Appl. No.: 829,066

[22] PCT Filed: Jul. 23, 1990

[86] PCT No.: PCT/GB90/01127
§ 371 Date: Mar. 2, 1992
§ 102(e) Date: Mar. 2, 1992

[87] PCT Pub. No.: WO91/01790
PCT Pub. Date: Feb. 21, 1991

[30] Foreign Application Priority Data

Aug. 7, 1989 [GB] United Kingdom ............... 8918006

[51] Int. Cl.⁵ ............................................. B01D 29/66
[52] U.S. Cl. ................................. 210/411; 210/416.1
[58] Field of Search ................. 210/257.2, 321.69, 350, 210/351, 407, 408, 411, 412, 414, 416.1, 791; 55/302

[56] References Cited

U.S. PATENT DOCUMENTS

2,312,999 3/1943 DeLanger ........................... 210/407
3,994,810 11/1976 Schaeffer ........................... 210/103

FOREIGN PATENT DOCUMENTS

1276086 10/1961 France.
2289222 5/1976 France.

*Primary Examiner*—Matthew O. Savage

[57] ABSTRACT

A strainer for straining entrained solid material from a fluid is disclosed herein. The strainer includes a screen having at least one restricted opening, and a row of inflatable bellows adjacent the screen, and means for inflating the bellows to back wash the screen to remove residue therefrom.

3 Claims, 4 Drawing Sheets

FLUID STRAINER INCLUDING INFLATABLE BELLOWS FOR BACKWASHING SAME

This invention relates to strainers which can be used for the removal of solid or liquid particles or other contaminating material from a fluid, for example plankton from seawater, particles from a gas, or sand from a liquid. The particles may be of various shapes and sizes e.g. from several microns to several millimeters.

Water is used to maintain the pressure of liquid in natural submarine petroleum reservoirs but many of the reservoirs are in the form of porous rocks, and plankton can, if permitted to enter the rocks, choke the small pores thereby making it more difficult to inject water into the reservoir. For this reason it is desirable to employ water from which contaminants such as plankton have been removed.

Strainers usually have one or more openings and the fluid, from which the contaminating material is to be removed, passes through the opening(s). The material that is prevented from passing through the opening(s) may be too large to fit through the opening(s), or may be prevented from passing therethrough by some other means, for example an electrostatic force. Fluid that has been derived from contaminated fluid, by passing the latter through the opening(s) of a strainer, may be called a decontaminated fluid.

A phenomenon which occurs with many strainers is the blockage of the opening(s) by the residue of the particles or other entrained contaminating material which have been filtered or strained out of the fluid. The blockage of the opening(s) will usually restrict the flow of fluid through the opening(s) and increase the pressure difference between the contaminated fluid and decontaminated fluid.

In particular applications, such as the removal of plankton from seawater, it may be beneficial to remove the residue from the vicinity of the opening(s). This can enable a greater flow of fluid to pass through the opening(s), or cause a decrease in any potential build-up of pressure difference between the contaminated fluid and the decontaminated fluid. The removal of the residue may be effected on a continuous basis or may be carried out on a periodic basis.

There are a number of techniques employed for the removal of residue from the vicinity of the opening(s). Some techniques currently employed include the following.

(1) The passage of decontaminated fluid, or some other fluid, in the reverse direction through the opening(s). This flow in the reverse direction is known as backwashing. The fluid flowing in the reverse direction may flush away at least some of the residue from the vicinity of the opening(s); and there are various ways of effecting the backwashing.

(2) The use of apparatus to scrape the residue away from the vicinity of the opening(s).

(3) The rotation of the component provided with the opening(s) to allow centrifugal force to move the residue away from the vicinity of the opening(s).

(4) Chemical modification of the residue by, for instance, the use of an acid, solvent or some other chemical agent to dissolve the residue or allow the residue to be removed by other means.

(5) The alteration of the geometry or size of the opening(s), so as to permit dislodging of the residue or passage of the residue through the opening(s) whereupon it is discharged, but not sent to join the decontaminated fluid.

(6) The vibration of the residue.

(7) The spraying of the residue with a fluid which treats the residue.

Problems associated with existing backwashing methods used at least to partially remove the residue are as follows.

(A) The backwashing fluid does not remove all of the residue from the vicinity of the opening(s). In many circumstances a low percentage of the residue is removed from the vicinity of the opening(s), whereas it is usually preferable to remove a large percentage or all of the residue from the vicinity of the opening(s). Additionally, there is a tendency for the backwashing fluid to flow through the opening(s) in such a manner as to cause minimal pressure drop between the upstream and downstream side of the opening(s), for the particular flow rate of backwash fluid which is passing through the opening(s), i.e: the backwash fluid takes the "path of least resistance". Thus, a substantial proportion of the backwash fluid may pass through a part or parts of the opening(s) that have no substantial proportion of the residue in their immediate vicinity. This problem may become worse after a small proportion of the residue has been removed from the vicinity of the opening(s), thereby leaving a substantial amount of residue in the vicinity of other parts of the opening(s). To increase the amount of residue removed from the vicinity of the opening(s), the flow rate of the backwash fluid may need to be increased or the duration of the backwashing may need to be increased.

(B) The amount of fluid used in the backwashing can be a substantial quantity. In many circumstances the fluid used for the backwash needs to be decontaminated fluid. After passing back through the opening(s) the backwashing fluid will be contaminated with residue and may thus have to be disposed, i.e. the decontaminated fluid used for the backwash becomes so contaminated with residue that such fluid cannot be used for the process for which the decontaminated fluid is intended, without further treatment. It is therefore usual for fluid contaminated with residue to be disposed of.

(C) The duration that the strainer is backwashed is substantial, thus reducing the time in which the strainer can be properly employed to convert contaminated fluid to decontaminated fluid.

(D) Many backwash strainers are complex and require expensive manufacturing procedures during construction in order to achieve satisfactory performance. Some strainers require manufacture to high grade mechanical tolerances on some parts with the result that, when these parts wear or corrode, the strainer does not perform satisfactorily.

FR-A-2289222 discloses a strainer provided with a screen having one or more restricted opening(s), with provision for a fluid contaminated by entrained solid material to flow in normal use through the screen in one direction, whereby contaminating material of more than a predetermined size is filtered off because of its inability to pass through the opening(s), there being inflatable and deflatable bellows means in the vicinity of the screen and capable upon inflation of causing fluid to pass through the opening(s) in the screen in a direction opposite to the one direction so as to dislodge residue trapped by, and held in the vicinity of, the restricted opening(s).

According to the present invention, a strainer is provided with a screen having one or more restricted opening(s), with provision for a fluid contaminated by entrained solid or liquid material to flow in normal use through the screen in one direction, whereby contaminating material of more than a predetermined size is filtered off because of its inability to pass through the opening(s), there being inflatable and deflatable bellows means in the vicinity of the screen and capable upon inflation of causing fluid to pass through the opening(s) in the screen in a direction opposite to the one direction so as to dislodge residue trapped by, and held in the vicinity of, the restricted opening(s); and, according to the invention, such a strainer is characterized in that the bellows means is arranged, upon partial inflation, to abut against the screen at mutually spaced positions, and upon further inflation, to pump backwashing fluid through the or each part of the screen between the spaced positions.

It is the bellows means which are responsible, at least partially, for the desired backwash effect to clean the strainer according to the present invention, e.g. by acting as a pumping means either to push or to draw fluid through the opening(s).

The bellows means may comprise a row of bellows, each alternate set of which are inflatable separately from the intervening set. One alternate set of the bellows may then be inflated to close off respective sections of the screen, and thereby isolating intervening sections, which may subsequently be positively backwashed by inflation of the intervening set of bellows. The sets of bellows may, in a subsequent step, be inflated in reverse order to backwash positively the other screen sections.

Alternatively, the bellows means or the screen may be so formed with ribs that, upon partial inflation, the ribs abut the screen at the mutually spaced positions, further inflation causing the bellows means to deflect between the spaced positions.

The screen could take the form of a wall, which could be planar or substantially cylindrical, for example provided with many small openings. Alternatively, the screen could include a plurality of parallel members disposed so as to form a cylinder, the members being sufficiently close together to form between pairs of members the desired restricted openings. Instead, however, of a plurality of openings, a single continuous helical opening can be defined by the winding of a suitable wire around parallel supports. These different arrangements are commercially available as Trislot slot cylinders and Trislot slot tubes, which are made by Trislot Systems n.v., of Roterijstraat 134, B-8790 Waregem, Belgium. The word Trislot is a registered trade mark.

When the screen is substantially cylindrical, the one direction may be radially outwardly, but is preferably radially inwardly, the bellows means being within the screen and being inflatable for backwashing.

Figure 1:
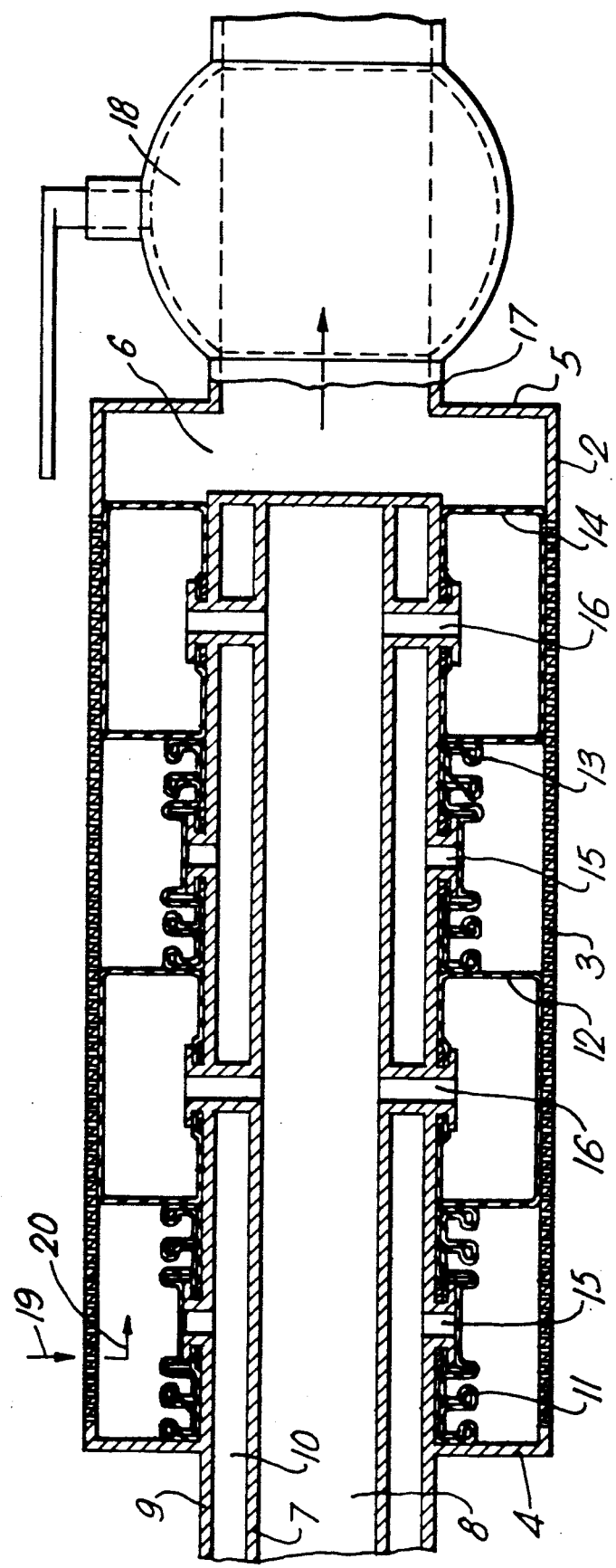
FIG. 1 is an axial section through a first example of a strainer in accordance with the present invention.

In FIG. 1 there is shown a strainer which has a cylindrical side wall 2 incorporating a screen 3 provided with openings. The cylindrical wall 2, together with associated end walls 4 and 5, define a chamber 6. Projecting into the chamber 6 is an inner tube 7 which is coaxially disposed with respect to the cylindrical side wall 2, the inner tube 7 defining an inner duct 8.

Coaxially disposed with respect to the inner tube 7 is an outer tube 9 of greater diameter, an outer duct 10 being defined between the inner tube 7 and the outer tube 9. The inner and outer tubes 7 and 9 are open at one end and sealed at the opposite end which is located within the chamber.

Disposed within the annular space between the exterior of the outer tube 9 and the interior of the cylindrical side wall 2 are, going from the end wall 4 towards the end wall 5, a row of four bellows 11, 12, 13 and 14.

Providing communication between the bellows 11 and 13 on the one hand and the outer duct 10 on the other hand are radial conduits 15; and providing communication between the interior of the bellows 12 and 14 on the one hand and the inner duct 8 on the other hand are radial conduits 16. The bellows can adopt the deflated position, as shown by bellows 11 and 13, or an inflated condition as shown by the bellows 12 and 14.

Disposed in the end wall 5 is an outlet pipe 17 in which is located a ball valve 18.

In normal operation of the strainer 1, all of the bellows 11, 12, 13 and 14 are deflated and there is a pressure outside the cylindrical side wall 2 of a magnitude such as to cause the fluid, which is contaminated, to pass inwardly through the openings in screen 3 in the direction shown by the arrows 19 and 20. The already decontaminated fluid flows along an annular zone, forming part of the chamber 6, and leaves by the outlet pipe 17, the ball valve 18 being open at this stage.

When it is desired to remove residue from the exterior of the screen 3, the ball valve 18 is closed, and fluid under increased pressure (i.e. greater than that outside the screen 3) is introduced into the inner duct 8 and, via the conduits 16, into the bellows 12 and 14. This causes some backwashing effect through the screen 3. Thereafter, fluid, for example, a gas, under pressure is introduced into the outer duct 10 and, via the conduits 15, into the bellows 11 and 13 thereby expelling the decontaminated fluid which is to serve as the backwashing fluid through those regions of the screen 3 between the already inflated bellows 12 and 14, and between bellows 12 and end wall 4.

When this action has taken place, the fluid pressure in the inner and outer ducts 8 and 10 can be reduced, thereby permitting the bellows 12, 14 and 11, 13 to deflate, after which the ball valve 18 is opened and the strainer continues to operate in its usual filtering mode.

Instead of introducing a fluid (gas or liquid) under a particularly high pressure through the inner and outer tubes 7 and 9 to effect the backwashing, a similar effect can be achieved by reducing the pressure of the decontaminated fluid outside the screen 3, which can equally permit the bellows 11 to 14 to expand and to drive contaminated material away from the opening(s) in the screen 3.

During the next backwash cycle, instead of first inflating the bellows 12 and 14, prior to the inflation of the bellows 11 and 13, it is possible to reverse the order so that initially the bellows 11 and 13 are inflated and thereafter the bellows 12 and 14 are inflated.

Figure 2:
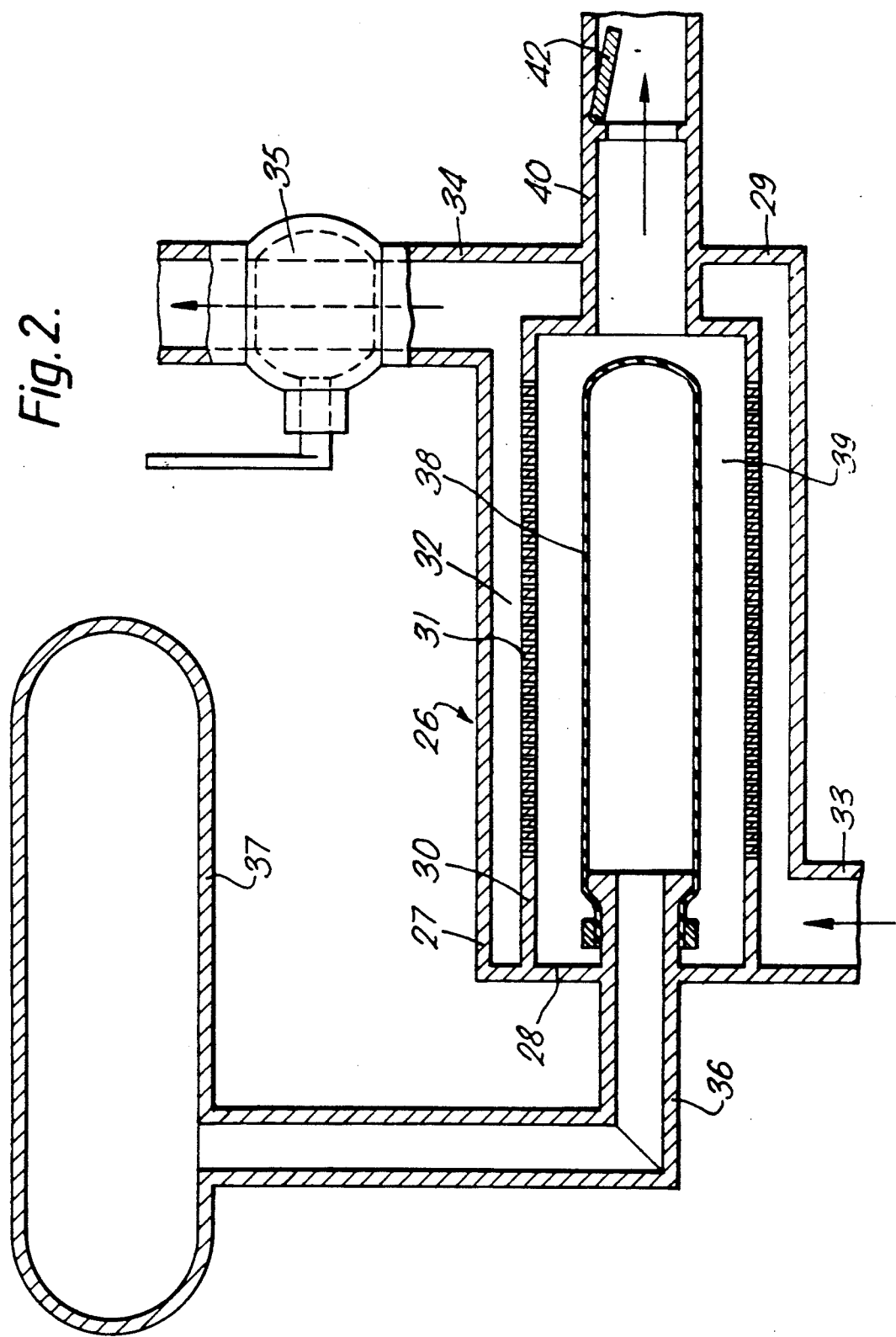
FIG. 2 is an axial section through a second example of a strainer which may be modified to be in accordance with the present invention.

Instead of having four separate bellows 11 to 14 as shown in the embodiment illustrated in FIG. 1 it would be possible to have a single longer bellows as shown in FIG. 2, but this would mean that the likelihood of fluid adopting the "path of least resistance" during the backwashing would be increased. The chances of this happening are reduced by having a plurality of bellows such as indicated in the embodiment of FIG. 1.

It will readily be appreciated that the particular construction of strainer shown in FIG. 1 could be adapted in many different ways. Thus, for example, the bellows could be mounted on the outside of the screen 3 within a suitable chamber and the number of bellows could be varied. Also, the screen 3, instead of being cylindrical, could be of some other shape, such as a flat screen.

The bellows may be made of any suitable material; for example, the bellows may be made of a metal or may be made of a fibre-reinforced plastic material, or a rubber material, provided that the material is suitable for the duty to which it will be subjected during the backwashing modes of the strainer.

The strainer of the type illustrated in FIG. 1 may be operated in parallel with, or in series with, other straining devices. The strainer as illustrated in FIG. 1 may have any appropriate auxiliary equipment associated with it, such as instrumentation, gas reservoirs, accumulators, valves, pressure piping and pressure vessels.

FIG. 2 of the drawings shows a different construction in which the screen is no longer the outermost component, but in which the bellows is still on the inside of the screen. In FIG. 2 there is shown a pressure vessel generally indicated by the reference numeral 26, the vessel having a cylindrical side wall 27 and two end walls 28 and 29. Located coaxially within the vessel 26 is a cylindrical wall 30 which extends from the end wall 28 of the vessel 26. The cylindrical wall 30 is provided with a screen 31, and there is thus defined between the cylindrical wall 30 and screen 31 on the one hand and the cylindrical side wall 27 on the other hand an annular chamber 32. The vessel 26 is provided with an inlet pipe 33 which communicates with one end region of the annular chamber 32, and is also provided with a pipe 34 communicating with the opposite end region of the annular chamber 32, the pipe 34 serving as an outlet during backwashing. The pipe 34 is provided with a ball valve 35.

Entering the vessel 26 through the end wall 28 is a pipe 36 which leads from a reservoir 37 containing fluid under pressure. The pipe 36 is of smaller diameter than the cylindrical wall 30 and the pipe 36 leads to a bellows 38 located coaxially within the vessel 26, and within the cylindrical wall 30 and screen 31. There is thus defined a generally annular zone 39 between the bellows 38 and the screen 31. That zone 39 communicates via a pipe 40 which passes through the end wall 29 and leads to a non-return valve 42.

In use, the equipment of FIG. 2 is operated as follows. During the filtering mode, the ball valve 35 is closed and contaminated fluid is passed through the pipe 33 to the annular chamber 32. The fluid passes through the screen 31 and decontaminated fluid leaves through the pipe 40 and passes through the non-return valve 42.

There is a constant mass of fluid in the zone defined by the reservoir 37, the pipe 36 and the bellows 38. During the filtering mode described above the pressure of fluid in the annular chamber 32 and in the annular zone 39 is such as to cause the bellows 38 to remain in the relatively deflated condition. However, when moving from the filtering mode to the backwashing mode, the ball valve 35 is opened, which permits a large fall in the pressure of fluid in the pipe 34 and in the annular chamber 32. This in turn permits a fall in pressure within the annular zone 39 which consequently allows the bellows 38 to inflate thereby causing a backwashing effect through the screen 31 so as to dislodge residue on the outer surface of the screen 31, which residue is then carried away by contaminated fluid entering by pipe 33 and flowing around the outside of the screen 31 and through the pipe 34 and valve 35.

With regard to the valve 42, during the filtering mode this valve is open whereas, during the backwashing mode, the fall in pressure of the fluid within the annular zone 39 causes the valve 42 to close or to close substantially.

Once the backwashing mode is completed, the valve 35 is closed which results in an increase in pressure in the annular chamber 32 and then in the annular zone 39, thereby causing the inflated bellows 38 to deflate. The contaminated fluid can then continue to flow through the screen 31 with the contaminants being removed by the screen 31 and with the resulting decontaminated fluid passing into the annular zone 39 and from there via the pipe 40 and the valve 42 to a suitable collection point.

Although a constant mass of fluid can be contained in the combination of the reservoir 37, pipe 36 and bellows 38, it is nonetheless possible to replace the reservoir 37 by a variable volume reservoir and/or to provide a compressor which can be used to vary the pressure of the fluid within the bellows 38.

Figure 4:
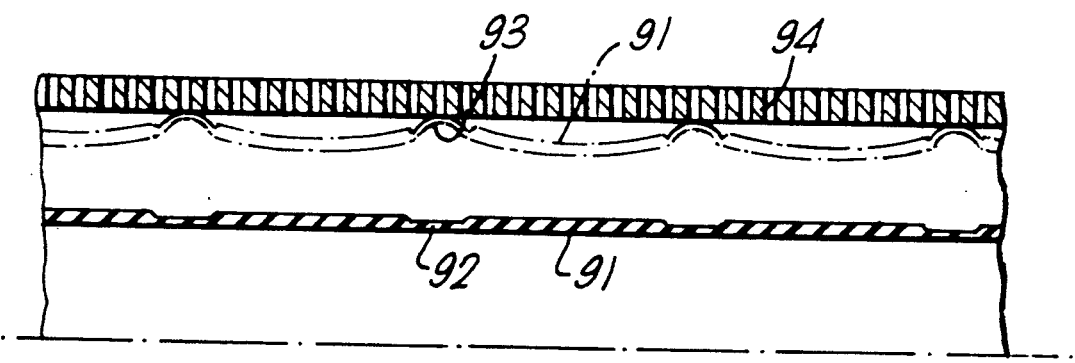
Figure 5:
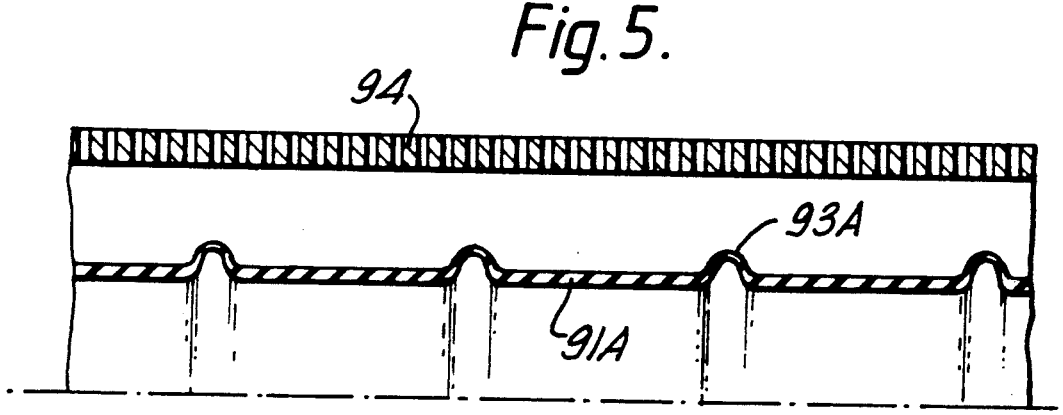

This discussion of FIG. 2 is necessary to understand the subsequent discussion of FIGS. 4 and 5.

Figure 3:
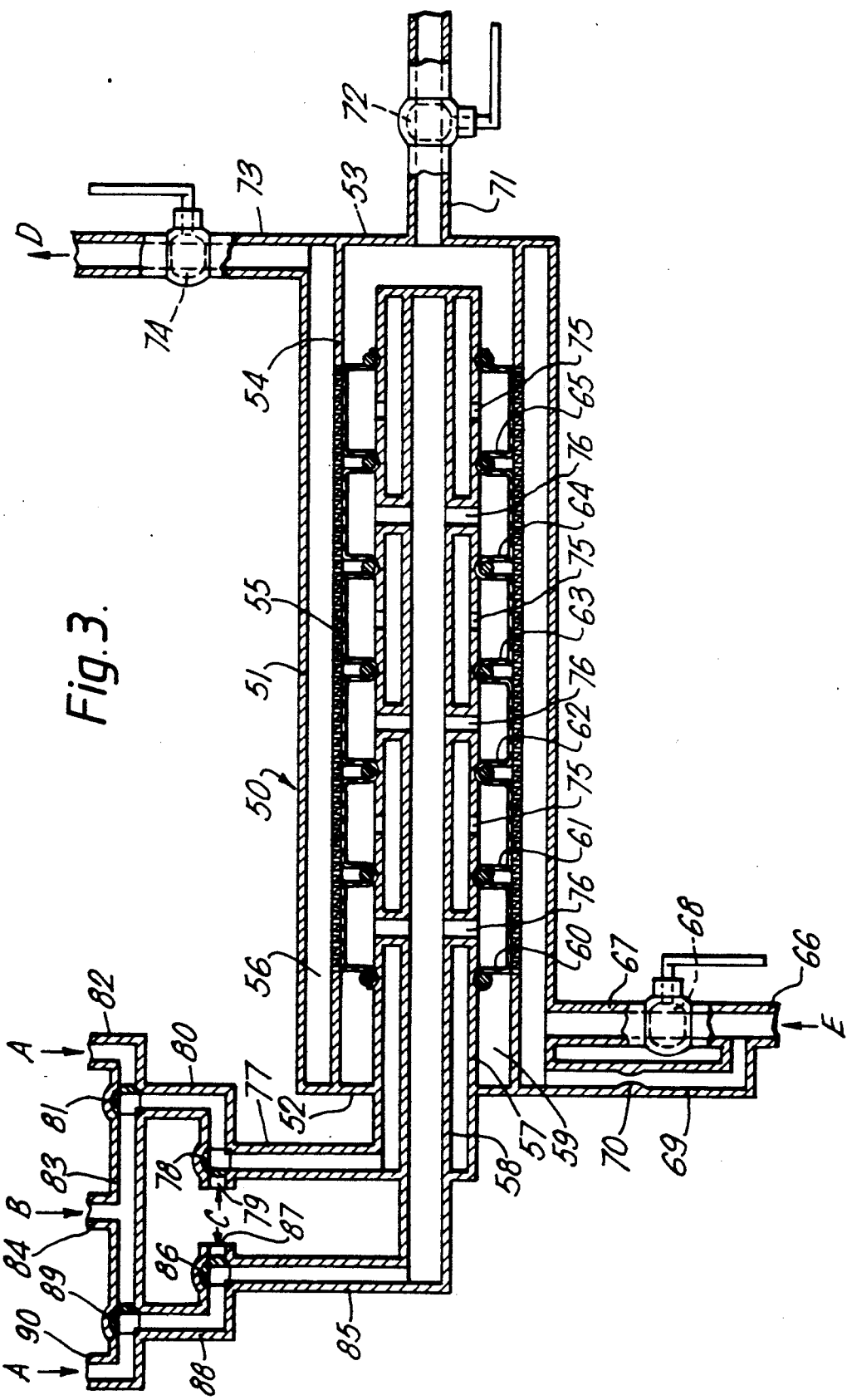
FIG. 3 is an axial section through a third example of a strainer which is in accordance with the present invention; and, FIGS. 4 and 5 are partial axial sections through modifications of the strainer shown in FIG. 2, which bring the strainer into accordance with the invention.

Turning now to the strainer shown in FIG. 3 of the accompanying drawings, there is a pressure containing vessel 50 which has a cylindrical side wall 51 and two opposite end walls 52 and 53.

Coaxially disposed within the vessel 50 is a cylindrical wall 54 provided with a screen 55 provided with openings. Defined between the cylindrical side wall 51 on the one hand and the cylindrical wall 54 and screen 55 on the other hand is an annular chamber 56.

Coaxially located with the vessel 50 and of smaller diameter than the cylindrical wall 54 is an outer pipe 57 and, within that, and spaced therefrom, an inner pipe 58. The outer pipe 57 and inner pipe 58 are closed at one end but pass through the end wall 52 of the vessel 50 at their opposite end region to the closed end.

Defined between the outer pipe 57 on the one hand and the cylindrical wall 54 and screen 55 on the other hand is an annular chamber 59 in which are located a row of six annular bellows 60, 61, 62, 63, 64 and 65.

The equipment also includes an inlet pipe 66 for introducing decontaminated fluid; the inlet pipe 66 has a first branch 67 in which is located a ball valve 68, and also has a second branch 69 in which is located a restriction 70. The first and second branches 67 and 69 open into one end region of annular chamber 56.

Communicating with the annular chamber 59 at that end thereof remote from the end wall 52 and adjacent the end wall 53 is an outlet pipe 71 for discharging decontaminated fluid, the outlet pipe 71 being provided with a ball valve 72.

At the opposite end region of the annular chamber 56 to the first and second branches 67 and 69 is an outlet pipe 73 and, located therein, a ball valve 74.

The outer pipe 57 is provided with ducts 75 which communicate with the bellows 61, 63 and 65; and the inner pipe 58 is provided with ducts 76 which communicate with bellows 60, 62 and 64.

The outer pipe 57, in a region externally of the end wall 52 of the vessel 50, communicates with a pipe 77 which leads from a valve 78 which, in addition to communicating with the pipe 77, communicates with a duct 79 and with a pipe 80 which, in turn, communicates with a valve 81. The valve 81, in addition to communicating with the pipe 80, communicates with a pipe 82 and a pipe 83 which leads to a further pipe 84.

The inner pipe 58, in a region externally of the end wall 52, communicates with a pipe 85 which leads from a valve 86. The valve 86, in addition to communicating with the pipe 85, communicates with a duct 87 and with a pipe 88 which, in turn, communicates with another valve 89. The valve 89, in addition to communicating with the pipe 88, communicates with a pipe 90 and also with another region of the pipe 83.

The valves 68, 72 and 74 can be moved from the closed position to the open position and vice versa. The four valves 78, 81, 86 and 89 are each designed so as to prevent communication altogether between the three pipes or ducts associated with the respective valves, but can be operated so as to permit communication between two, but not all three, of the respective associated pipes or ducts.

Thus, in use, the valve 78 will normally be positioned to provide communication between the pipes 77 and 80, or between the pipe 77 and the duct 79. Similarly, the valve 86 will normally be positioned to provide communication between the pipes 85 and 88, or between the pipe 85 and the duct 87.

The valve 81 will normally be operated to provide communication between the pipe 80 and the pipe 82, or between the pipe 80 and the pipe 83. Similarly, the valve 89 will normally be positioned so as to provide communication between the pipe 88 and the pipe 90, or between the pipe 88 and pipe 83.

The pipes 82 and 90 can be associated with a source of fluid at a pressure A. The pipe 84 can be associated with a source of fluid at a pressure B. The ducts 79 and 87 can be associated with fluid at a pressure C, which could be atmospheric pressure. The pipe 73, downstream of the valve 74 can discharge at a pressure D. The pipe 66 receives contaminated fluid at a pressure E.

Normally the pressure A will exceed the pressure B which, in turn, will exceed the pressure D. Also, normally the pressure B will exceed the pressure E which, in turn, will exceed the pressure C.

In operation of the strainer, during the filtering mode, all six bellows 60 to 65 are deflated or partially deflated, and the valves 68 and 72 are open and the valve 74 is closed. The valves 78 and 86 are operated so as to permit communication between the pipe 77 and duct 79 and between the pipe 85 and duct 87. Thus the bellows are at the relatively low pressure C.

Contaminated fluid enters the pipe 66 with the majority passing along the first branch 67 but a small amount passing along the second branch 69, into the annular chamber 56. The fluid then passes through the openings in the screen 55 with the contaminant residue collecting on the exterior of the screen 55. The decontaminated fluid passes into the chamber 59 and, from there, through the pipe 71 and valve 72 to the discharge point.

When it is time to effect backwashing, the valves 68 and 72 are closed, and the valve 74 is opened. The second branch 69 with its restriction 70 nonetheless permits a small amount of contaminated fluid to continue to enter the annular chamber 56 so as to remove residue which is dislodged from the screen 50 during the backwashing, and to effect its removal through the pipe 73 and valve 74. At this stage the valve 86 is operated so as to effect communication between the pipes 85 and 88 and the valve 89, if not already correctly operated, is operated so as to effect communication between the pipe 88 and the pipe 90, thus permitting fluid at pressure A to pass through the pipes 90, 88, 85 and 58, and then through the ducts 76 so as to inflate the bellows 60, 62 and 64, thereby partially effecting the backwashing as decontaminated fluid within the annular chamber 59 is forced back through the screen 55 into the annular chamber 56. After a short time the valve 78 is operated to effect communication between the pipes 77 and 80 and the valve 81, if not already in the correct position, is operated to effect communication between the pipes 80 and 83, whereby fluid at the pressure B passes through the pipes 84, 83, 80, 77 and 57 to the ducts 75, thereby causing the bellows 61, 63 and 65 to inflate, thereby effecting backwashing in different zones of the screen 55.

Thereafter, the valves 78 and 86 are operated so as to effect communication between the pipe 77 and the duct 79 and between the pipe 85 and the duct 87, thereby permitting the pressure within the interior of the bellows 60 to 65 to fall to pressure C, thus allowing the bellows to deflate, at least partially. This will cause some contaminated fluid to be drawn through the screen 55 with the residue remaining on the exterior so that the annular chamber 59 is again full of decontaminated fluid.

At this stage, the backwashing exercise is repeated but with the bellows 61, 63 and 65 first being inflated at the higher pressure A and thereafter the other bellows 60, 62 and 64 being inflated at the high, but nonetheless lower, pressure B. This is effected by operating valve 81 so as to cause communication between pipes 82 and 80 and operating valve 78 so as to cause communication between pipes 80 and 77, whereby fluid at pressure A can communicate with the interior of the bellows 61, 63 and 65. Thereafter, the valve 89 is operated so as to cause communication between the pipes 83 and 88 and the valve 86 is operated so as to cause communication between the pipes 88 and 85, whereby fluid at pressure B can enter the bellows 60, 62 and 64.

When the backwashing mode is completed, the valves 78 and 86 are operated so as to permit communication between the pipe 77 and duct 79 and between the pipe 85 and duct 87, thereby allowing the high pressure within the bellows 60 to 65 to fall, thus permitting the bellows to deflate, at least partially. At this stage the valves 68 and 72 are opened and the valve 74 is closed. At this stage the full filtering mode is resumed.

The advantage of inflating bellows alternatively as in the FIGS. 1 and 3 examples is that an annular isolated zone is formed between two spaced apart bellows so that an intermediate bellows can have an effective backwashing effect with the fluid being unable to escape except through the openings in the screen opposite the intermediate bellows.

However a similar effect can be achieved in a single step by modifying the bellows of the FIG. 2 example to provide, as shown in FIG. 4, a bellows 91 which has a series of annular rings 92 of reduced wall thickness. When the bellows is initially inflated from the position shown in full lines, the bellows expands preferentially at the rings 92 to form outwardly protruding annular ribs 93 which, as the bellows continues to expand radially, abut and form annular lines of seal against the screen 94. This isolates annular sections of the screen from one another. Upon further inflation of the bellows, 91, the portions between the ribs 93 expand outwardly towards and into, or nearly into, contact with the screen, thereby ensuring positive backwashing of each section of the screen.

A similar effect could be achieved if, instead of being provided with the rings 92 of reduced wall thickness, the bellows 91 is replaced by a bellows 91A which is profiled with preformed ribs 93A. Similarly the bellows could be an unprofiled cylinder and the screen profiled with inwardly projecting annular ribs to seal against the bellows as it is partially inflated.

I claim:

1. An apparatus for straining entrained solid material from a fluid comprising:
   a screen having at least one restricted opening, said screen being generally rigid;
   means for directing a fluid contaminated with entrained solid material to flow through said screen in a first direction, whereby contaminating material of more than a predetermined size is filtered off because of its inability to pass through said at least one opening;
   inflatable bellows means spaced from said screen, wherein said bellows means comprises a first means for contacting said screen at mutually spaced positions, and wherein said bellows means comprises second means between said first means for then moving toward said screen between said mutually spaced positions to pump fluid back through said at least one opening in said screen in the direction opposite to said first direction; and
   means for inflating said bellows means to cause said first means to contact the screen and to cause said second means to move toward said screen to pump fluid through said at least one opening in the screen in a direction opposite to said first direction so as to dislodge residue trapped by, and held in vicinity of, said at least one opening.

2. An apparatus for straining entrained solid material from a fluid comprising:
   a screen having at least one restricted opening;
   means for directing a fluid contaminated with entrained solid material to flow through said screen in a first direction whereby contaminating material of more than a predetermined size is filtered off because of its inability to pass through said at least one opening;
   a row of inflatable bellows means adjacent said screen, wherein said bellows means comprises a first set of bellows alternately spaced along said row and a second set of bellows intervening between the bellows of said first set;
   first means for inflating said first set of said bellows means to move toward the screen and cause fluid to pass through said at least one opening in the screen in a direction opposite to said first direction so as to dislodge residue trapped by, and held in the vicinity of, said at least one opening; and
   second means for inflating said second set of said bellows means to move toward the screen and cause fluid to pass through said at least one opening in the screen in a direction opposite to said first direction so as to dislodge residue trapped by, and held in the vicinity of, said at least one opening.

3. An apparatus for straining entrained solid material from a fluid comprising:
   a substantially cylindrical screen having at least one restricted opening, said screen being generally rigid;
   means for directing a fluid contaminated with entrained solid material to flow through said screen in a first direction, whereby contaminating material of more than a predetermined size is filtered off because of its inability to pass through said at least one opening;
   inflatable bellows means within said substantially cylindrical screen, wherein said bellows means comprises first means to contact said screen at generally annular mutually spaced positions, and wherein said bellows means comprises second means to move toward said screen between said spaced positions to cause fluid to pass through said at least one opening in the screen in a direction opposite to said first direction so as to dislodge residue trapped by, and held in vicinity of, said at least one opening; and
   means for inflating said bellows means radially outwards to cause said first means to contact the screen and to cause said second means to move toward said screen to pump fluid through said at least one opening in the screen in a direction opposite to said first direction so as to dislodge residue trapped by, and held in vicinity of, said at least one opening.

* * * * *